Figure 1:
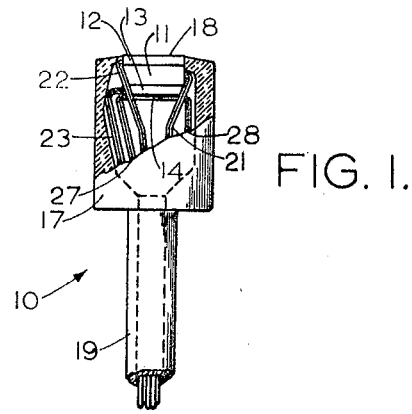

INVENTOR.
Neal A. Cook

– Patented July 25, 1967

3,332,285
FAST PRECISION TEMPERATURE SENSING
THERMOCOUPLE PROBE
Neal A. Cook, 2142 Blake Road SE.,
Cedar Rapids, Iowa 52403
Filed Oct. 19, 1964, Ser. No. 404,702
1 Claim. (Cl. 73—359)

This invention relates in general to temperature measuring thermocouple probes, and in particular to precision temperature sensing thermocouple probes having fast temperature correction capabilities.

When various thermocouple probes are placed in contact with a surface for measuring surface temperature or immersed in a fluid for a temperature reading in the fluid a thermal energy transfer to or from the probe occurs. Obviously, greater thermal energy transfer occurs with greater initial temperature differences between probe and substance being temperature checked. With higher substance temperature the transfer is to the probe while with lower substance temperature the transfer is from the probe. It has been found that such existing temperature differentials prove quite troublesome in the process of obtaining accurate temperature readings. Further, with respect to the matter of time when precise temperature readings are required, considerable time, sometimes hours and even days, is necessary to obtain close temperature stabilization of probes to the temperature being measured. Even when considerable time is expended for temperature equalization and stabilization between substance and probe the desired results may not be obtained for particular instances of time particularly if a dynamic process is involved. Furthermore, thermal energy transfer to or from a thermocouple probe may so alter the temperature of the substance being temperature checked as to profoundly alter the validity of temperature readings being taken.

It is, therefore, a principal object of this invention to minimize thermal energy transfer between a thermocouple probe and substance being temperature checked.

Another object is to greatly shorten the time required for thermocouple probe temperature equalization and stabilization substantially at the temperature of the substance being temperature checked.

A further object is to provide means for determining the degree of thermocouple probe temperature equalization and stabilization with the substance being temperature checked, and for calibration of readings taken at simultaneously determined and recorded probe temperature differentials for determining instantaneous variations of probe and substance temperature equalization for various temperature levels.

Features of the invention, useful in accomplishing the above objects, include a primary sensor plate of metal having substantially parallel opposite sides of predetermined spacing to which are affixed like dissimilar metal flat plates each thinner than the primary sensor plate but otherwise substantially of the same shape. These three plates of metal form two thermocouple junctions at each side of the primary sensor plate at the respective interfaces betwen the plates. A lead wire of like metal is attached to each of the three plates and these extend to instrumentation and control circuitry as appropriate. The outer face of one of the three plates is the exposed temperature probe contact face used for engaging contact with substance to be temperature checked. The innermost face of the three plates is attached by a bonding agent having electrical insulating properties to a temperature changing device controlled by electronic control loop circuitry. It should be noted further that the probe structure may be in the form of a hand held probe with an attached extended handle or in the form of flat probe transducers that may be taped, glued, or soldered to a surface or inserted into a permanent temperature well. Further, in various forms of the probe an important feature is that the entire multiple plate structure along with the temperature changing device is substantially completely enclosed within temperature change resistance material having low thermal conductive properties except for the exposed outer substance engaging and temperature sensing face of the probe and possibly some of the leads.

Specific embodiments representing what are presently regarded as the best modes of carrying out the invention are illustrated in the accompanying drawing.

Figure 2:
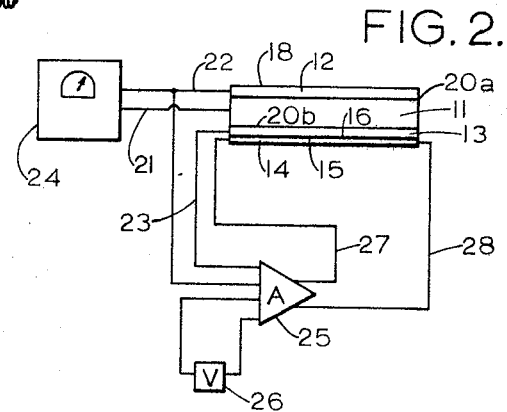
Figure 3:
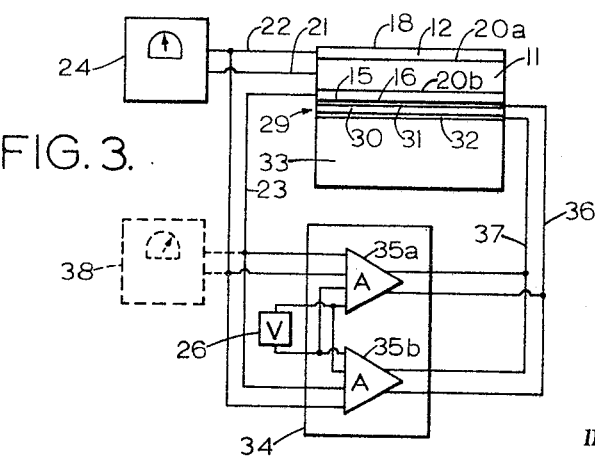

In the drawing:

FIGURE 1 represents a partial view of a manually manipulated and positionable probe partially broken away for greater detail;

FIGURE 2, a schematic of the working components and circuitry of a heater equipped differential temperature sensing thermocouple probe; and FIGURE 3, a schematic similar to FIGURE 2 of such a thermocouple system equipped with a combination heater-cooler and a heat sink section.

Referring to the drawing:

The thermocouple probe 10 of FIGURE 1 is shown to include a primary sensor metal plate 11 having opposite substantially parallel sides affixed to duplicate flat metal plates 12 and 13 of dissimilar metal from the metal of plate 11. This subassembly, also shown in FIGURE 2 with associated connected measuring and control circuitry, additionally includes a heater element 14 attached by a bonding agent 15, of heat conductive but electrical insulative properties for example epoxy glue or resin glue, to the innermost face 16 of the three plates. The plates 11, 12, and 13 along with the heater element 14 are, as a multiple plate structure, substantially completely enclosed within a housing 17, of temperature change resistance material, a temperature insulator such as one of various ceramics having low thermal conductive properties, except for the exposed outer substance engaging and temperature sensing face 18 of plate 12 and of the probe 10. Housing 17, as a hand held probe, is shown to have an extended tubular handle 19 through which the various wire leads extend. Obviously the housing 17 would be somewhat modified in providing substantially the same function in other forms of the probe such as flat probe transducers that may be taped, glued, or soldered to a surface or inserted into a permanent temperature well, or in other various forms.

The interface junctions of metal plates 12 and 13 with primary sensor metal plate 11 form dual thermocouple junctions 20a and 20b with for example plate 11 being copper and plates 12 and 13 constantan or, alternately, plate 11 being an alloy named Alumel and plates 12 and 13 an alloy named Chromel. The plates 11, 12, and 13 are provided with lead wires 21, 22 and 23, of like metal, respectively, each of which and other wires may be provided with insulation as indicated in FIGURE 1 although wire insulation may not be required in some probe configurations. Obviously, the wires should not be shorted together except for proper circuit connections. Heater element 14 could be a relatively thin sheet of nickel chromium alloy (i.e. Nichrome). Actual typical approximate dimensions of the plates of the assembly could be for example in thickness 0.005 inch for plate 11, a thinner 0.002 inch thickness for each of plates 12 and 13, with the heater sheet element 14 being 0.0005 inch thick, and with the plate assembly approximately 1/16-inch in diameter.

In any event leads 21 and 22 are connected to an electromotive force actuated instrument 24 that may be calibrated to give temperature readings as determined by the thermoelectric voltage developed through the thermocouple junction 20a. A branch of lead 22 and lead 23 are connected as controlling input leads to a voltage potential differential controlled amplifier 25. Voltage power supply 26 is connected to amplifier 25 to provide driving power for the amplifier and power output from the amplifier as controlled by the relative voltage potential levels of the leads 22 and 23. The relatively low resistance power output leads 27 and 28 of amplifier 25 are connected to opposite sides of heater element 14.

During operation of the embodiment of FIGURES 1 and 2 the thermocouple probe 10 is used to measure temperatures generally higher than ambient and, at least, higher than the initial temperature of the probe. When the temperature sensing face of the probe is brought into contact with a surface to be temperature checked or immersed in a fluid to be temperature checked a temperature drop occurs in the surface or fluid as an immediate ensuing thermal energy transfer occurs to and through the temperature sensing face 18 to the thermocouple plate assembly. This results in a temperature gradient across the thermocouple plate assembly with the temperature at the thermocouple junction 20a being higher than the temperature at the thermocouple junction 20b. This is so at least initially very shortly after contact of the probe 10 with substance being temperature checked. Thus, with such a temperature gradient through the primary sensor plate 11 the thermoelectric voltage being generated at the higher temperature of thermocouple junction 20a is of greater magnitude than the thermoelectric voltage being simultaneously generated at thermocouple junction 20b at its relatively lower temperature.

The lead wires 22 and 23 apply the voltage potentials developed by the two thermocouple junctions 20a and 20b, respectively, as inputs to amplifier 25. The amplifier 25 is capable of detecting voltage differentials of lead 22 over lead 23 out of thermocouple junctions 20a and 20b, respectively, in an approximate range of 0.001 millivolt to 1 millivolt. Further, the amplifier 25 provides a power output varying from low power output with small voltage differential input to higher power output with larger voltage differential input. Such amplifier 25 power outputs are fed through lines 27 and 28 to suitably operate heater element 14 which by heating quickly drives the temperature gradient through the plate assembly and particularly through primary sensor plate 11 between thermocouple junctions 20a and 20b toward zero.

Generally, a temperature gradient will remain across primary sensor plate 11 and between junctions 20a and 20b until the temperature gradient between probe temperature sensing face 18 and the substance being temperature checked is zero. Then when the temperature gradient between probe face 18 and the substance being temperature checked is zero there is no thermal energy flow from the substance being checked to the probe. The temperature then indicated by instrument 24 as a result of the electromotive force generated through thermocouple junction 20a and fed through leads 21 and 22 is theoretically that of the substance being checked. Thus, thermal energy transfer between substance being checked and a thermocouple probe is minimized and errors in temperature measurement reduced substantially, at least theoretically to zero.

It should be noted that variations in probe temperature measuring sensitivity may be provided by varying the thickness of primary sensor plate 11 and/or selecting various copper based alloys or various other suitable metal alloys or other materials. By such steps the temperature transfer characteristics through the plate 11 may be varied as desired. Different probe sensitivity may also be provided by varying the thickness and/or the material of the duplicate plates 12 and 13 at each side of primary plate 11. Obviously, various of these changes also affect probe sensitivity by changing the temperature electromotive force generating characteristics of the thermocouple junctions 20a and 20b.

In the embodiment of FIGURE 3 a thermocouple probe is provided that can be used to measure temperature below as well as above ambient. This probe, which includes a housing 17 as with the embodiment of FIGURES 1 and 2, differs from the other embodiment in that when measuring substance temperatures below ambient heat must be removed from the thermocouple plate assembly. This requirement is in addition to the required ability to function substantially the same in supplying heat as with the embodiment of FIGURES 1 and 2 when measuring substance temperatures above ambient.

Components substantially the same in the embodiment of FIGURE 3 as in the embodiment of FIGURES 1 and 2 are, as a matter of convenience, numbered the same. The components 11 through 24, except heater element 14, are the same and function in substantially the same manner as with embodiment of FIGURES 1 and 2. Heater element 14 is replaced by heater-cooler 29 attached by the layer of a bonding agent 15 to the innermost face 16 of the three plates 11, 12, and 13 as part of the FIGURE 3 embodiment multiple plate structure. The heater-cooler assembly 29 includes a metal plate 30 of for example lead telluride provided with metal plates 31 and 32 establishing electrical contact with the respective opposite sides of the plate 30. Plate 31 has its other side in contact with a bonding agent 15, and the other side of plate 32 is in contact with a heat sink 33 of suitable thermal energy absorbing or releasing material.

In the FIGURE 3 embodiment a branch of lead 22 and lead 23 are connected to amplifier unit 34 and by branch connections thereof to amplifier sections 35a and 35b in unit 34. Voltage power supply 26 is connected to both amplifier sections 35a and 35b to provide driving power for both amplifier sections and power output from either amplifier section as controlled to provide outputs by the relative voltage potential levels of the leads 22 and 23. Both amplifier sections 35a and 35b have connections through lines 36 and 37 to, respectively, plates 31 and 32.

When the thermocouple probe of FIGURE 3 is used to measure substance temperatures above ambient and the temperature gradient is such that the voltage potential in lead 22 is higher than the voltage potential in lead 23 one of the amplifier sections 35a or 35b is activated. The section activated provides an output such that the direction of current flow through the heater-cooler assembly 29 makes it act as a heater. This is with heat sink 33 being a heat source and the assembly 29 giving substantially the same operational results with respect to temperature gradients relative to sensor plate 11 and thermocouple junctions 20a and 20b as with the embodiment of FIGURES 1 and 2. However, when the probe is used to measure substance temperature below ambient and the resultant initial temperature gradient in the thermocouple plate assembly is such that the voltage potential in lead 22 is lower than the voltage potential in lead 23. This results in the other of the amplifier sections 35a or 35b being activated. The section so activated provides a reverse current flow through leads 36 and 37 and the heater-cooler assembly 29 making it function as a cooler. This cooling action is provided relative to sensor plate 11 and thermocouple junctions 20a and 20b by the Peltier thermocouple cooling action with one direction of current flow through the heater-cooler assembly 29. With this action the current flow causes a pumping of heat from the sensor plate 11 side to the heat sink 33. Thus, for substance temperatures both above and below ambient thermal energy transfer between substance being checked and a thermocouple probe is minimized and errors in temperature measurement reduced substantially to zero.

An additional electromotive force actuated instrument 38 which may be of the null reading type and indicated in phantom in FIGURE 3 may be connected between leads 22 and 23 in both embodiments. Connected as shown it could be used for determining the degree of thermocouple probe temperature equalization and stabilization with substance being temperature checked, and for calibration of readings simultaneously determined and recorded on both instruments 24 and 38. These readings could be used for probe temperature differentials and for determining instantaneous variations of probe and substance temperature equalization for various temperature levels.

Whereas this invention is here illustrated and described with respect to several specific embodiments thereof, it should be realized that various changes may be made without departing from the essential contribution to the art made by the teachings hereof.

I claim:

In a temperature sensing probe for measuring temperature of substance being temperature checked; a primary sensor plate having, a first side and second side in substantially parallel spaced relation; first and second flat plates of material dissimilar from the material of said primary sensor plate; said first flat plate having a surface in contact with said first side of the primary sensor plate and forming a first thermocouple junction through the common surface interface thereof; said second flat plate having a surface in contact with said second side of the primary sensor plate and forming a second thermocouple junction through the common surface interface thereof; said first and second thermocouple junctions being separated by the thickness through the material of said primary sensor plate between said first and second sides thereof; thermal energy changing means mounted by a bonding agent in thermal energy transferring relation through a relatively thin layer of said bonding agent first to said second flat plate and successively through the second flat plate to said second thermocouple junction and the primary sensor plate; mounting and enclosing means for said primary sensor plate, said first and second plates, and said thermal energy changing means, in assembled relation, and with a portion of said first flat plate exposed to the exterior from said mounting and enclosing means for direct contact with substance being temperature checked; means sensing electromotive force developed in said first and second thermocouple junctions and responsive to the differential between the outputs of said first and second thermocouple junctions to control said thermal energy changing means to reduce the thermocouple output differential toward a minimum value; and means sensing and indicating electromotive force developed through only said first thermocouple junction wherein said means sensing differentials between outputs of said first and second thermocouple junctions is amplifier circuit means having output line means connected to said thermal energy changing means; and wherein said thermal energy changing means is a heater including a relatively thin sheet of nickel chromium alloy.

References Cited

UNITED STATES PATENTS

| 2,811,856 | 11/1957 | Harrison | 73—355 |
| 3,217,538 | 11/1965 | Loeb | 73—190 |
| 3,233,458 | 2/1966 | Vrolyk | 73—190 |

FOREIGN PATENTS

| 587,996 | 5/1947 | Great Britain. |

OTHER REFERENCES

Measurement of Surface Temperature by M. W. Boyer et al.; "Industrial and Engineering Chemistry," vol. 18, No. 7, July 1926 pp. 728–729.

DAVID SCHONBERG, *Primary Examiner.*

LOUIS R. PRINCE, N. B. SIEGEL, D. McGIEHAN,
*Assistant Examiners.*